United States Patent Office 3,206,626
Patented Sept. 14, 1965

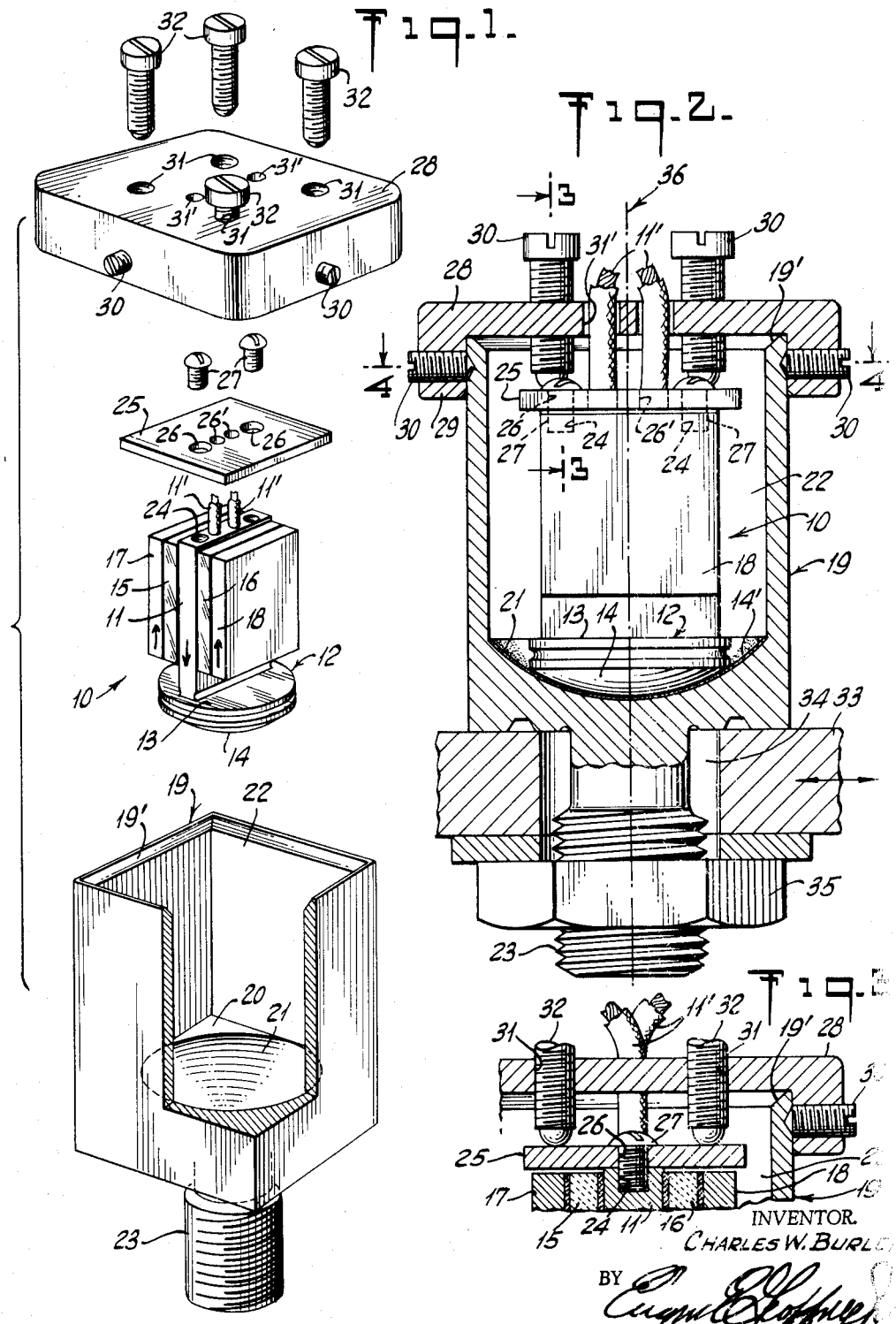

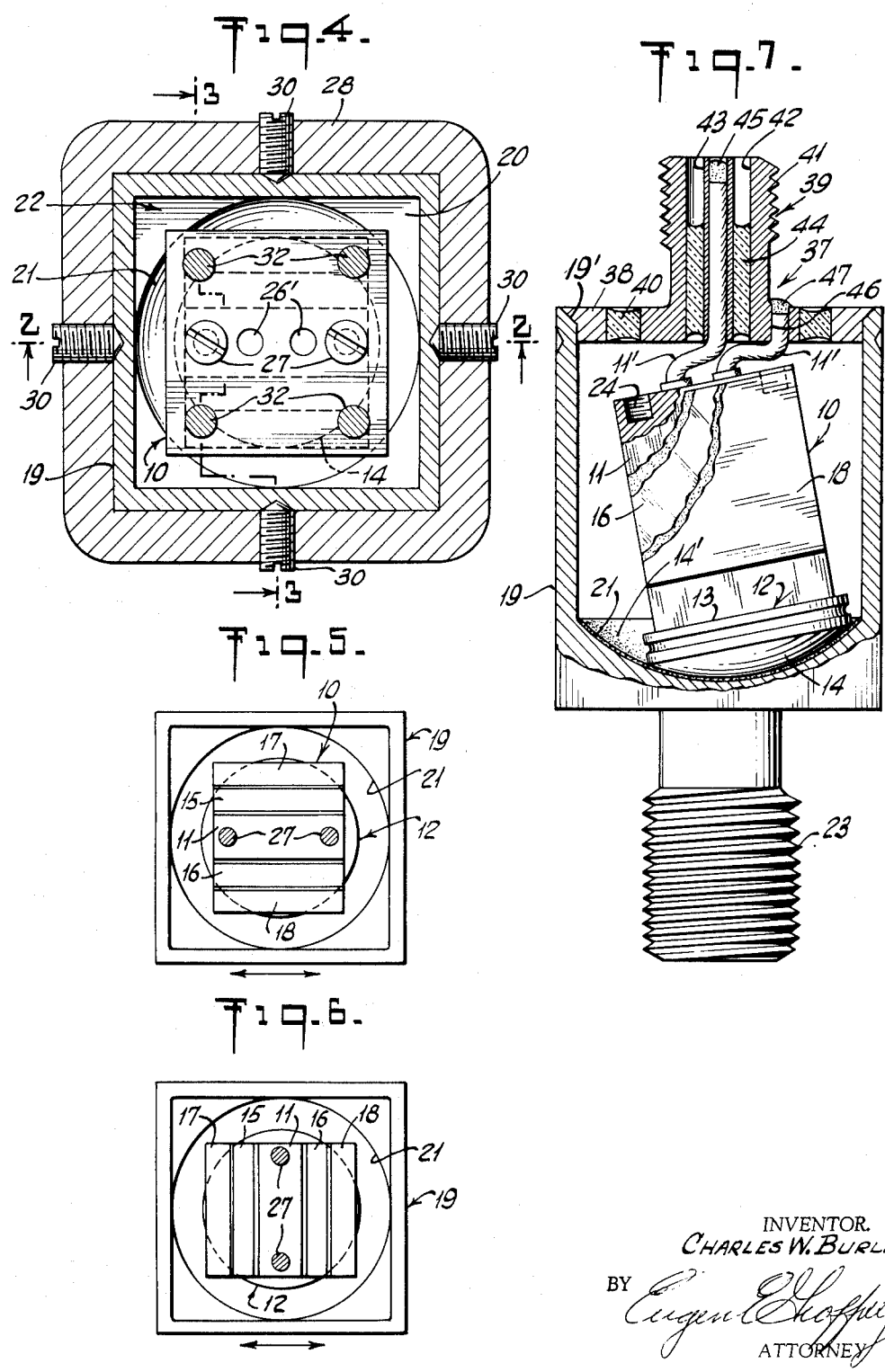

3,206,626
ACCELEROMETER
Charles W. Burley, Costa Mesa, Calif., assignor to Electra Scientific Corporation, Fullerton, Calif., a corporation of California
Filed May 15, 1962, Ser. No. 194,937
9 Claims. (Cl. 310—8.4)

This invention relates to accelerometers and more specifically to a novel and improved accelerometer and mount therefor that enables the attainment of a high degree of accuracy in the measurement of acceleration along a selected axis and overcomes manufacturing difficulties heretofore encountered.

While the invention is generally useful for many types of accelerometers, it is particularly useful in connection with accelerometers utilizing seismic elements embodying crystal transducers. One form of element as transducer that has been found to be most effective is the so-called "balanced" unit having a center plate-like support with a crystal cemented on each face of the support, and the outer faces of the crystals carrying relatively heavy masses. When the unit is subjected to velocity changes along a central axis in the plane of the central support the heavy masses or weights will subject the crystals to a shearing stress and thereby generate a voltage. This structure has, however, presented considerable difficulty since it is virtually impossible to provide pairs of identical crystals and weights. Furthermore, when cementing the crystals and the weights to the central support, slight variation will modify the magnitude of the signal from each crystal sufficiently to produce an error in the resultant reading and cause material response of the transducer to motion normal to the selected axis along which measurement of acceleration is desired.

This invention overcomes the difficulties heretofore encountered in the manufacture of accelerometers and provides a novel and improved mount and method of installation of the transducer which will compensate for normal manufacturing tolerances and enable the fabrication of exceedingly accurate and precise accelerometers at considerably reduced cost.

A still further object of the invention resides in a novel and improved mount for an accelerometer that is characterized by its simplicity of manufacture and relatively low cost.

A still further object of the invention resides in the provision of a novel and improved accelerometer mount wherein the accelerometer may be disposed within the mount in such a manner that acceleration along a selected axis can be measured with a high degree of accuracy and accelerations normal to the selected axis are minimized.

The above and other objects and advantages of the invention will become more apparent from the following description and accompanying drawings forming part of this application.

In the drawings:

FIG. 1 is an exploded view of an accelerometer in accordance with the invention, together with means for adjustably securing the transducer element within the housing.

FIG. 2 is a cross-sectional view of the accelerometer shown in FIG. 1 and taken along the line 2—2 of FIG. 4.

FIG. 3 is a cross-sectional view of a fragmentary portion of FIG. 4 taken along the line 3—3 thereof.

FIG. 4 is a cross-sectional view of FIG. 2 taken along the line 4—4 thereof.

FIGS. 5 and 6 are diagrammatic views illustrating test procedures for adjusting the position of the transducer within the mount or housing.

FIG. 7 is a cross-sectional view of a completed accelerometer in accordance with the invention.

In the manufacture of accelerometers, it is important that the accelerometer be highly sensitive to changes in acceleration along a selected axis and at the same time produce minimum response to acceleration in any axis normal to the selected axis. Heretofore, it has been the practice to prepare precision mounts for accelerometer transducers and then secure the transducer within the mount in a symmetrical relationship to the selected axis. In fabricating the transducer unit forming the sensitive measuring device, it was therefore important to control manufacturing tolerances to an exceedingly high degree of precision in order to be sure that the completed accelerometer had minimum sensitivity to the motions normal to the desired axis of motion. Experience has indicated that even with the most carefully controlled manufacturing techniques only a few percent of the total number of transducers manufactured would have cross axis response of the order of ½ to 1% of the response in the desired axis of motion. As a result, it has been the practice to fabricate the transducers with a maximum possible precision and then grade the finished units by individual testing procedures.

With this invention, it is possible to fabricate transducers and install them in mounts so that the resultant units are substantially all within a predetermined percentage value of cross axis response. While it is generally desirable to maintain a high degree of precision in the fabrication of the transducer and the mount in accordance with the invention, it will become apparent that in many cases it is possible to obtain uniformly accurate accelerometers while at the same time permitting the use of larger tolerances in the fabrication of the elements.

Certain of the difficulties heretofore encountered in the use of crystal transducers for accelerometers stem from the characteristics of the crystals themselves. All crystals, including polarized polycrystalline ceramics, have electro-mechanically sensitive directions of excitation. In the case of natural materials or single crystal materials, the desired mode of operation is selected by cutting in proper relation to the natural axis of piezoelectric orientation. In the case of polycrystalline ceramics, the desired mode of operation may be achieved by polarizing and electroding in selected directions. In the example shown in FIG. 1, the shear mode is used. The elements respond, therefore, to shear stresses as shown in FIG. 1. The invention applied, however, to other configurations utilizing compression or bending modes. The electrical output is a maximum when the mechanical force is applied parallel to the sensitive axis and decreases sinusoidally to zero as the direction of force application is rotated until it is normal to the sensitive axis.

In the use of crystals for seismic transducers to measure acceleration, it is evident that the transducer will generate a voltage under conditions wherein the stress is applied at an angle other than 90° to the stress or electromechanical axis. Under ideal conditions, stresses applied at precisely 90° to the electromechanical axis will produce a negligible signal. Thus, known manufacturing techniques have emphasized the importance of maintaining extremely close tolerances of the crystals and the mounts in order to attain precise alignment of the electromechanical axis of the crystal with the axis of symmetry of the transducer. Furthermore, balanced crystal arrangements utilizing multiple crystals have afforded substantial improvement, since the utilization of two crystals balanced one against the other cancelled some of the inaccuracies and provided improved mechanical and electrical symmetry. Nevertheless, the need for extremely close manufacturing tolerances greatly affected the cost of the completed structure and even then, accuracies within ±1% could not be obtained except by selection from a large number of units.

It has been found that each transducer has one "ideal" electromechanical axis and with the utilization of an improved procedure and structure in accordance with this invention for the location of this axis and its alignment with the mechanical axis of the transducer mount, substantially all completed units of a production run can be maintained within a predetermined tolerance of less than 1%.

Referring now to the drawings, the transducer in accordance with the invention is generally denoted by the number 10, and includes a center plate-like support 11 secured to a circular base 12 having a plane upper surface 13 and a lower surface 14 having a spherical contour, a pair of ceramic elements 15 and 16 each of which is provided with metallic coatings on their opposing surfaces, cemented to the center support 11, and masses 17 and 18 cemented to the outer surfaces of the crystals 16 and 17. The metallic coatings on the crystals are connected so that the voltages generated by the crystals will be in parallel relationship so that the resultant signal produced by acceleration will be the average of the two signals. It is desirable in the fabrication of a transducer of this character that the crystals be substantially identical in size and electric characteristics and that the masses or weights 17 and 18 be substantially identical. This produces a more nearly symmetrical unit and minimizes the influence of motions normal to motion along the mechanical axis. With highly controlled manufacturing tolerances and with precision alignment of the axes of symmetry of the transducer and the housing, the average accelerometer may have approximately 5% side sensitivity, that is, the signal produced by the accelerometer when it is driven in a direction normal to the desired axis of motion may be as much as 5% of the signal produced when the accelerometer is driven in the desired direction with the same acceleration.

Actual tests with this invention have indicated that the side sensitivity of an accelerometer can be reduced to less than 1% and this is attained by improved coordination of the trandsucer and the mount. More specifically, the housing in accordance with the invention is generally denoted by the numeral 19 and it has a base 20 with a depression 21 therein having a contour that will mate with a contour 14 on the transducer base 12. The reference 48 is carefully machined flat and is substantially normal to the mounting stud 23. Consequently, the reference surface 48 is the permanent reference of orientation, both for adjustment in accordance with this invention and for installation of the accelerometer for use as an accelerometer. The housing is further provided with upwardly extending side walls 22 and a mounting stud 23. The mounting stud 23 is generally coincident with the central axis of the depression or recess 21, and the axis of the stud is coincident with the mechanical axis along which acceleration will be measured. The surface 21 of the housing is then coated with an appropriate cement such as epoxy resin and the transducer 10 is placed within the housing. In accordance with the invention, a novel and improved procedure is utilized to locate the ideal electromechanical axis of the transducer 10 and align it precisely with the axis of the housing, so that the crystals will produce a minimum signal as a result of acceleration applied to the accelerometer which are normal to the axis of the housing.

Adjustmnet of the transducer 10 within the housing 19 is accomplished in a precise manner though the mechanical fixtures may be of any desired form. In the instant embodiment of the invention, the center support 11 is provided with a pair of threaded holes 24, and a plate 25 having holes 26 therein is secured to the top of the center support 11 by means of a pair of screws 27. A cover plate 28 having downwardly depending side walls 29 is placed over the top of the housing 19 and is secured in place by set screws 30. The top of the cover 28 is provided with four openings 31 which threadably receive screws 32. The lower ends of these screws bear at the corners of the plate 25 as may be observed in FIG. 2, and by properly adjusting the screws, the transducer 10 can be tilted at any desired angle within the housing 19. The leads 11' from the crystals 15 and 16 are brought out through holes 26' in plate 25 and holes 31' in plate 28.

With the transducer assembled as shown in FIG. 2, it is then mounted on a vibrating table 33 having an opening 34 extending therethrough to accommodate the stud 23. The transducer is secured to the table by means of a nut 35 threadably engaging the stud. With the transducer mounted on the table, the table is then vibrated along one axis normal to the principal mechanical axis, the latter being generally denoted by the dotted line 36. The output of the transducer is measured and then the transducer is tilted within the housing by means of the screws 32 until the signal produced by the transducer as a reuslt of the horizontal vibration is reduced to a minimum value. In this way, the ideal electromechanical axis of the transducer is precisely aligned in one plane with the axis of the mount. When this has been accomplished, the transducer is then rotated 90° and it is again subjected to horizontal vibration. Should a signal be detectable on the leads 11', the transducer is tilted in a direction 90° to the plane of the initial tilt, thus completing alignment of the ideal electromechanical axis with the axis of the mount or housing.

Upon completion of the testing procedure as described above, the accelerometer may then be stored until such time as the cement 14' has hardened. In the case of an epoxy resin, the setting of the epoxy can be accelerated by subjecting the accelerometer to an elevated temperature provided, however, that the temperature will not damage or otherwise injure the transducer.

Once the cement 14' has hardened, the cover 28 is removed by loosening the set screws 30, and the plate 25 is removed by disengaging the screws 27. The unit is now ready for attachment of the permanent closure member which includes an electrical connector. This structure is shown in FIG. 7.

The permanent closure is generally denoted by the numeral 37 and has a peripheral configuration coordinated with the peripheral configuration of the top edge 19' of the mount 19. The permanent closure has a surrounding ring 38 preferably of metal or other suitable material that may be cemented or otherwise secured to the top edge of the mount 19. A central coaxial connector 39 is secured within ring 38 by an appropriate insulating material 40 which preferably has a coefficient of expansion approximately equal to the coefficient of expansion of the material of which the ring 38 and connector 39 are formed. In this way, the connector is hermetically sealed to the ring 38 and when the latter is hermetically sealed to the housing, the transducer 10 will be completely protected against the deleterious effects of moisture, air and other gases.

The connector 39 has a threaded portion 41 for receiving a cooperating connector and includes a central opening 42 which has a tubular member 43 secured therein by insulating material 44. One lead 11' of the transducer 10 is inserted within tube 43 and electrically connected thereto by solder 45 or other suitable electrical connecting means. The connector 39 is further provided with an opening 46 in the base thereof for the reception of the other lead 11' of the transducer 10 which is electrically connected to the connector 39 by solder 47 or other appropriate fastening means that will insure a positive and permanent electrical connection.

The completed accelerometer as shown in FIG. 7 of the drawings now has its true electromechanical axis in substantially precise alignment with the principal mechanical axis 36 of the unit, and the transducer will therefore respond to accelerations along the principal mechanical axis of the finished unit and will have negligible response to motions normal to the mechanical axis.

It has been found in actual practice that manufacturing tolerances can be substantially relaxed in the manufacture of crystal transducers without materially affecting the accuracy of the finished unit in relatively large production runs. Substantially all units produced will have transverse sensitivities well within the tolerance of plus or minus 1%. In the event a transducer is so defective that it cannot be adjusted to produce the desired precision, such transducer will be detected during the testing phase and can be discarded, in which case the only loss encountered will have been the cost of preparing the transducer unit 10 which is only a portion of the total cost of a finished unit. Thus, material saving in labor and material is effected and the resultant accelerometers will be produced well within a selected range of accuracy. It is also evident from the foregoing description that during the testing procedure the final accuracy of the accelerometer is determined. Thus, if a given quantity of accelerometers are merely required to have side sensitivity of plus or minus 2%, the alignment of the transducer 10 within the housing 19 does not have to be nearly as precise as that required for transducers in which accuracies of plus or minus 1% are required.

In connection with the transducer unit, it is evident that other types of electrical and electromechanical transducers may be utilized in connection with the invention. While it has been found that the balanced transducer as illustrated, for instance, in FIG. 1, has been most effective for use in precision accelerometers, it is possible to utilize this invention with transducers, wherein crystals are subjected to compressive stress rather than a shearing stress. In this case, the electromechanical axis of the crystal being subjected to electromechanical stress would be precisely aligned with the principal mechanical axis of the completed unit so that the accelerations normal to the principal mechanical axis will be minimized.

While only certain embodiments of this invention have been illustrated and described, it is apparent that modifications, changes and alterations may be made without departing from the true scope and spirit thereof.

What is claimed is:

1. An accelerometer comprising a transducer having a principal electromechanical axis and responsive to changes in velocity in a direction coincident with said principal electromechanical axis to produce signals proportional to said changes, and a mount for said transducer, said mount having a predetermined principal mechanical axis and a curved surface portion located in a selected position relative to said principal axis, a cooperating member carrying said transducer and having a curved surface portion mating with the first said curved surface portion, said member being selectively positioned relative to said mount with said electromechanical axis in coincident alignment with said principal mechanical axis and means securing said element to the first said curved surface portion with said axes in said coincident alignment.

2. An accelerometer according to claim 1 wherein said curved surface portions have a spherical configuration.

3. An accelerometer according to claim 1 wherein said curved surface portions have a spherical configuration and the first said curved surface portion is substantially symmetrically disposed about said principal mechanical axis.

4. An accelerometer comprising a housing having a principal mechanical axis, a crystal transducer within said housing and having a central plate-like support, at least two crystals with each crystal secured to one side of said support and weights secured to the outer surfaces of said crystals, a mounting base secured to said support and cooperating mounting means on said base and housing, said base selectively positioned and secured to said mount with the ideal electromechanical axis of the transducer substantially coincident with said principal mechanical axis, said cooperating means comprising spherically curved surfaces on said housing, a mating surface on said base and means cementing said surfaces one to the other.

5. The method of mounting a transducer responsive to changes in velocity to produce proportional changes in electrical signals, comprising the steps of placing said transducer on a mount having a selected principal mechanical axis, subjecting said mount and transducer to velocity changes normal to said principal mechanical axis while measuring signals produced by said transducer, adjusting said transducer relative to said mount to minimize signals produced during acceleration normal to the principal mechanical axis and then fixing said transducer to said mount in said adjusted position.

6. The method according to claim 5 wherein said mount and transducer are subjected to velocity changes in two perpendicular directions normal to the principal mechanical axis.

7. An accelerometer comprising a transducer having a principal electromechanical axis and responsive to changes in velocity in a direction coincident with said axis to produce signals proportional to said changes, said transducer including a central plate-like support, at least two crystals with each crystal secured to one side of said support and weights secured to the outer surfaces of said crystals, and a mount for said transducer, said mount having a predetermined principal mechanical axis and a curved surface portion located in a selected position relative to said principal axis, means carrying said transducer and having a curved surface portion mating with the first said curved surface portion, said carrying means being selectively positioned on said mount with said electromechanical axis in coincident alignment with said principal mechanical axis and means securing said carrying means to the first said curved surface portion with said axes in said coincident alignment.

8. An accelerometer comprising a transducer having a principal electromechanical axis and responsive to changes in velocity in a direction coincident with said prinicpal electromechanical axis to produce signals proportional to said changes, a housing for said transducer, said housing having a tubular configuration, means closing one end of said housing and having a curved portion on the inner side thereof and means on the outer surface thereof for securing said accelerometer to an object for measurement of acceleration of said object, said housing having a principal mechanical axis defining the direction in which velocity changes are to be measured, mounting means on said transducer and having a curved surface portion mating with the first said curved surface portion, the last said mounting means being selectively positioned relative to the first said curved surface portion with said electromechanical axis in coincident alignment with said principal mechanical axis, means securing said transducer in said housing with the axes in coincident alignment and insulated terminal means closing the other end of said housing, said terminal means including connections to said transducer.

9. An accelerometer comprising a transducer having a mechanical centerline axis and a principal electromechanical axis and responsive to changes in velocity in a direction coincident with said principal electromecahnical axis to produce signals proportional to said changes, and a mount for said transducer, said mount having a predetermined principal mechanical axis, transducer supporting means on said mount, cooperating supporting means on said transducer, one of said supporting means being positioned relative to the other supporting means to secure said transducer in position in said mount with its electromechanical axis in precise coincident alignment with said principal mechanical axis of said mount and independent of the mechanical centerline axis of said transducer.

References Cited by the Examiner
UNITED STATES PATENTS

| | | | |
|---|---|---|---|
| 3,093,759 | 6/63 | Orlacchio | 310—8.4 |
| 3,104,334 | 9/63 | Bradley et al. | 310—8.4 |
| 3,104,335 | 9/63 | Shoor | 310—8.4 |

MILTON O. HIRSHFIELD, *Primary Examiner.*